(12) United States Patent
Hosokawa

(10) Patent No.: US 9,557,586 B2
(45) Date of Patent: Jan. 31, 2017

(54) COLLIMATOR AND OPTICAL ISOLATOR WITH COLLIMATOR

(75) Inventor: Tadatoshi Hosokawa, Saitama (JP)

(73) Assignee: Furuuchi Chemical Corporation, Tokyo (JP)

( * ) Notice: Subject to any disclaimer, the term of this patent is extended or adjusted under 35 U.S.C. 154(b) by 45 days.

(21) Appl. No.: 14/129,986

(22) PCT Filed: Jun. 29, 2012

(86) PCT No.: PCT/JP2012/066811
§ 371 (c)(1),
(2), (4) Date: Apr. 8, 2014

(87) PCT Pub. No.: WO2013/002402
PCT Pub. Date: Jan. 3, 2013

(65) Prior Publication Data
US 2014/0300962 A1    Oct. 9, 2014

(30) Foreign Application Priority Data

Jun. 29, 2011 (JP) ................................. 2011-156104

(51) Int. Cl.
| | |
|---|---|
| *G02B 5/30* | (2006.01) |
| *G02F 1/09* | (2006.01) |
| *B23K 26/08* | (2014.01) |
| *B23K 26/20* | (2014.01) |
| *B23K 26/38* | (2014.01) |
| *G02B 6/27* | (2006.01) |

(Continued)

(52) U.S. Cl.
CPC .............. *G02F 1/093* (2013.01); *B23K 1/0056* (2013.01); *B23K 26/064* (2015.10); *B23K 26/0648* (2013.01); *B23K 26/08* (2013.01); *B23K 26/20* (2013.01); *B23K 26/38* (2013.01); *G02B 6/2746* (2013.01)

(58) Field of Classification Search
None
See application file for complete search history.

(56) References Cited

U.S. PATENT DOCUMENTS 4,178,073 A * 12/1979 Uchida ............... G02B 6/2746
                                                                    359/281
4,239,329 A * 12/1980 Matsumoto ..................... 385/11
(Continued)

FOREIGN PATENT DOCUMENTS

JP          53149046 A  * 12/1978
JP          55113020 A  *  9/1980
(Continued)

*Primary Examiner* — Arnel C Lavarias
(74) *Attorney, Agent, or Firm* — Carrier Blackman & Associates, P.C.; Joseph P. Carrier; William D. Blackman

(57) ABSTRACT

An optical isolator with a collimator which is used at the tip end of a laser beam transmitting fiber utilized in a laser processing. The optical isolator can provide solutions to the problems how to make return lights to be isolated from an incident light path and how to prevent the light energy from being conducted to an incident fiber, a laser oscillator, the collimator, and the optical isolator. The solutions include light-receiving fibers disposed at focal points of a collimator lens to which reflected lights from a workpiece return through the optical isolator. The return lights are then led to a ceramic tube where the return light energy is converted to thermal energy and dissipated.

6 Claims, 2 Drawing Sheets

(51) Int. Cl.
*B23K 1/005* (2006.01)
*B23K 26/06* (2014.01)

(56) References Cited

U.S. PATENT DOCUMENTS

| | | | |
|---|---|---|---|
| 4,548,478 A * | 10/1985 | Shirasaki | G02B 5/30 |
| | | | 359/256 |
| 5,315,431 A * | 5/1994 | Masuda et al. | 359/281 |
| 5,408,354 A | 4/1995 | Hosokawa | |
| 6,697,414 B1 | 2/2004 | Kato et al. | |
| 6,711,310 B2 * | 3/2004 | Chang et al. | 385/11 |
| 7,306,376 B2 | 12/2007 | Scerbak et al. | |
| 7,426,325 B2 * | 9/2008 | Scerbak | G02F 1/095 |
| | | | 385/31 |
| 7,433,558 B2 * | 10/2008 | Booth et al. | 385/34 |
| 2009/0308852 A1 * | 12/2009 | Alpay | B23K 26/046 |
| | | | 219/121.72 |

FOREIGN PATENT DOCUMENTS

| | | |
|---|---|---|
| JP | S58-28561 U | 2/1983 |
| JP | S58-28561 B2 | 6/1983 |
| JP | S61-58809 B2 | 12/1986 |
| JP | 02-068515 A | 3/1990 |
| JP | 2775547 B2 | 5/1998 |
| JP | 11-072747 A | 3/1999 |
| JP | 2000-039590 A | 2/2000 |
| JP | 2001-094205 A | 4/2001 |
| JP | 2009-168894 A | 7/2009 |

* cited by examiner

COLLIMATOR AND OPTICAL ISOLATOR WITH COLLIMATOR

FIELD OF THE INVENTION

This invention relates to an optical isolator with an optical collimator which is set at the tip end of a light transmitting fiber conveying a fiber laser light energy to a workpiece to be processed by, for example, cutting, marking or soldering. This optical isolator with the optical collimator is used to prevent return lights reflected from the object from entering into the light transmitting fiber and a laser light source.

BACKGROUND OF THE INVENTION

Solid-state YAG lasers were previously used for a laser welding, cutting, or marking of metals in metal processing. Fiber lasers were recently developed and begun to be used practically in the wavelength region between 1.0 micrometer and 1.1 micrometers. The fiber lasers are paid attention as a replacement of YAG lasers.

Optical reflectivity of metals is very high in these wavelength regions, especially the optical reflectivity of gold, silver, copper, and aluminum are more than 90%. Although iron, nickel, and cobalt metals have relatively low optical reflectivity and suit for laser processing in these wavelength regions, the optical reflectivity of these metals is more than 50%. It must be taken into consideration that a considerable amount of the laser light energy returns to the laser light source, though all of the radiated energy does not return to the laser light source because the surface of the metal workpiece is not always mirror finished surface.

Resonant material of a YAG solid-state laser is crystal and that of a fiber laser is quartz glass which has a lower power damage threshold than crystals. For this reason, a return light to the laser light source and particularly an incident light normal-incidence to the light source have to be avoided. The use of an optical isolator is ultimately effective in cases of fiber lasers wherein the optical polarization plane can always be changed arbitrary. The polarization independent optical isolators are especially useful.

The polarization independent optical isolator is an optical device composed of two optical polarizers made of birefringent crystal and a Faraday rotator. The polarization independent optical isolators are classified into two types with its crystal polarizer type. One optical isolator is using plane plate polarizers, and the other is using wedge polarizers.

In the case of the plane plate type optical isolator, one incident collimated optical beam is separated into two parallel beams after passing through the plane plate polarizer. The two parallel beams propagate through the Faraday rotator whose area of cross section must be at least $2\phi$, that is twice as large as the diameter $\phi$ of the incident beam. On the other hand, in the case of the wedge type optical isolator, the incident beam is separated into two beams, i.e. an ordinary light beam and an extraordinary light beam, at a definite angle $\theta$ after passing through the polarizer. The diameter of the Faraday rotator must be $\phi+d\times\tan\theta$, where d denotes the distance between two wedge polarizers. The numerical values of these parameters, namely, beam diameter $\phi$, distance between polarizers d, and the beam separation angle $\theta$ determines which type of isolator is more advantageous. It can generally be said that the wedge isolator has an advantage, because the required Faraday rotator cross sections do not increase as a beam diameter increases. In the case of the plane plate type optical isolator, the more power of the fiber laser, the more beam diameter increases practically. In view of this fact, it is expected that there will be an increase in demand for the wedge type optical isolators and that the high durability to the high power fiber laser will be needed for the wedge type optical isolators.

PRIOR ART

Patent Documents

JP,58-028561,B (1983)
JP,61-058809,B (1986)
JP,2775547,B
U.S. Pat. No. 5,408,354A
U.S. Pat. No. 7,306,376B2
U.S. Pat. No. 7,426,325B2
JP,2009-168894,A

SUMMARY OF THE INVENTION

Problem to be Solved by the Invention

It must be recognized that there is a difference in a character of the optical isolator used for fiber lasers in laser processing such as welding, cutting, or marking processing, from that of optical isolators previously used for optical communications. The optical isolator for laser processing needs measures to release safely the thermal energy of return light to protect the laser system from thermal damage, because the return light energy is very high.

In wedge type optical isolators, the return light focuses at two points which are apart by a distance $f\times\tan\theta$ from the incident point, where f is the focal length of the lens, $\theta$ is the return angle mentioned in the previous section.

For optical isolators used for optical communications, it is important to determine focal length f and angle $\theta$ of return beam angle of the inline optical isolator so that the focal points may have a sufficient distance wherein the return light does not couple with the core of the incident light fiber. The core diameter is only about 10 µm. The return light may go back to fiber clad of 125 nm diameter, which is acceptable.

However, in isolators for high power fiber laser processing, return light power is so high that the return light must be configured not to couple with the core of the incident light fiber and that the value of $f\times\tan\theta$ must be determined to be sufficiently large enough for the return light not to go back to clad of the fiber. Or, otherwise, the thermal energy will heat the fiber, surrounding polymer material, ferrule, or the inner wall of the optical isolator and result in destroying the collimator or the laser oscillator itself, at last end.

One of the previous solutions for this issue is found in the U.S. Pat. No. 7,426,325, for instance, showing an inline polarization independent optical isolator equipped with special optical collimators which are monolithically composed of fibers, an end cap or a lens with end cap such as shown in the U.S. Pat. No. 7,306,376. By using this collimator, the return light does not return to a laser oscillator, nor damage fibers or collimators.

In the previous solution, the return light energy however diverges to the surroundings such as collimator holders and isolator holders around the collimator and heats them. This means that a temperature increase occurs in magnets, components of the isolator. Since the magnet has such properties that its magnetic field intensity depends upon temperature, characteristics of the isolator change with the change of temperature of magnets. If the workpiece under laser processing is a high reflective material, the isolator needs water cooling. In the case that the reflectivity of the workpiece is very high, the use of the isolator in the laser processing will be restricted.

The purpose of this invention is to supply a mechanism to safely isolate the return light from the collimator, the surrounding holder, and the isolator without accumulating the return light energy, change the light energy to thermal energy and evacuate the thermal energy to dissipate it.

Means for Solving the Problem

In order to resolve the above mentioned problem, the inventor fabricated such a mechanism that optical fibers receive the return light from an optical isolator to separate the light from the collimator, optical isolator and the laser oscillator, and change the light energy to thermal energy to safely dissipate it.

Three optical fibers are aligned in parallel with the same distance apart. The center fiber is used to emanate light from laser oscillator and the emanated light is led to optical isolator through a lens. Two outside fibers are used to receive return light from the optical isolator. The received light is led to a heat-resistant article such as ceramics placed apart from the laser source in order to change the light energy to the thermal energy. Then the thermal energy is cooled by water or air in the ceramics. To fix the three fibers, a three-hole ferrule or a three-line grooved plate with grooves arranged at the same distance apart can be used.

The whole system is schematically drawn in FIG. 1. Light emitted from a fiber laser 1 is led to a first fiber 2 fixed at the center of the three fibers. The light is emanated from an end of the fiber 2 to a lens 5. It is desirable for the light passing area at the end of the fiber 2 to be large in order to protect the end area from high power damage. For this purpose, it is desirable to enlarge a core of the fiber 2 at the end area or weld an end cap of pure fused silica glass to the end area of the fiber 2. The light passing through the lens 5 becomes a collimated beam. After passing through a set of elements, the first wedge polarizer 6, Faraday rotator 34, and the second wedge polarizer 11, which is called generally in optical devices as a non-reciprocal part 35 of isolators or circulators, the beam splits into two parallel beams. The birefringent crystal plate 12 is used to combine two parallel beams as disclosed in the previous invention of the inventor of the U.S. Pat. No. 5,408,354 A. The distance between these two parallel beams becomes as large as the distance between the first wedge polarizer 6 and the second wedge polarizer 11 becomes large. However, inversely, if a sufficiently thin Faraday rotator is discovered in the future, it is possible that the distance between the first and the second wedge polarizers is very small. At that time, the distance between two parallel beams becomes short, and therefore, the birefringent crystal plate 12 will be eliminated. The collimated beam passes through a condense lens 14 and then focuses at a focal point 16 on a workpiece 15.

All the irradiated light is not absorbed as the energy for processing into the workpiece under processing. Part of the light is reflected at a reflection rate determined by the workpiece material. The reflected light becomes collimated beam when returning through the second lens 14. When the collimated beam returns through the isolator, the return beams make some angle θ with the incident beam. The angle θ is determined by the wedge angle of the isolator. As is shown in FIG. 2, the backward light beams are focused on two points 19 and 20 which are f×tan θ away from the end of the first fiber. If ends of two fibers 22 and 23 are disposed at these focusing points, then the energy of reflection light from the workpiece under processing can be effectively captured. The return light never returns to the first fiber 2 or the laser oscillator 1. It is desirable for core diameters of the second and third fibers 22 and 23 to be larger than that of the first fiber 2 because the role of the second and third fibers is only to receive the light. It is desirable for the ends of the core of the second and third fibers to be expanded or to have end caps in order to protect the core ends from high power light energy. The other ends of second and third fibers are led to a high temperature durable ceramic tube 24 whose one end is closed. Moreover, the ceramic tube is covered with a stainless tube 25 whose one end is closed. The stainless tube is cooled by water or air.

Technical Effect of the Invention

As is described in previous section, some amount of light is reflected without absorbed into the processing workpiece. The reflected light energy is completely isolated with the optical isolator and the triple fiber collimator of this invention from the first fiber and the laser oscillator. The reflected light energy is led with the second and the third fibers to the high temperature durable tube and changed to thermal energy. The reflected light energy thus gives no damages to the laser oscillator and the transmitting fiber.

A MODE FOR EMBODYING THE INVENTION

Zirconia ferrules are conventionally used to fix fibers positioning precisely. Zirconia ferrules with several holes precisely positioned are recently marketed. An example of this invention using a three-hole zirconia ferrule is shown below.

Working Example

Figure 1:
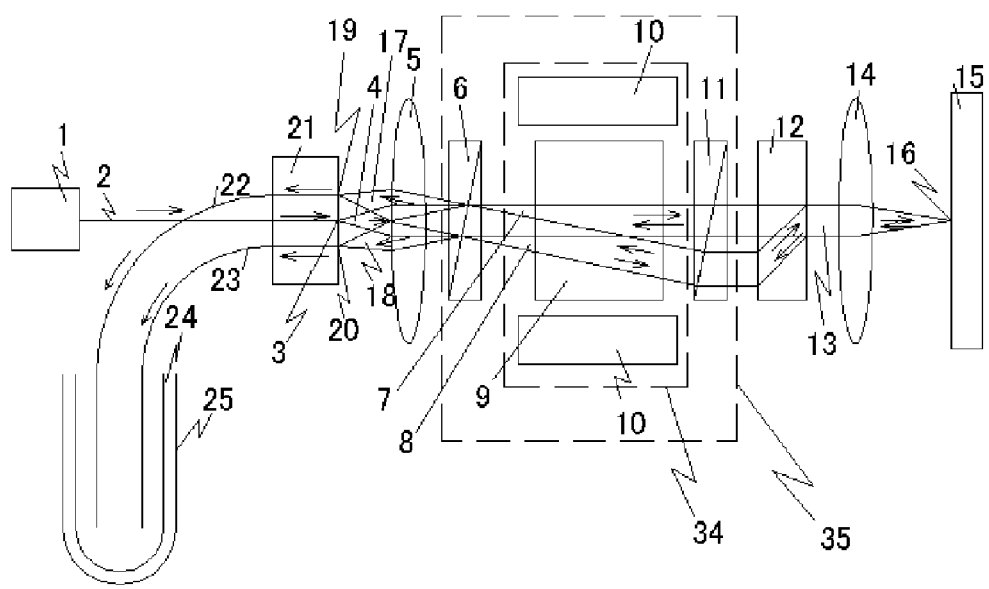
FIG. 1: the whole scheme of this invention
Figure 2:
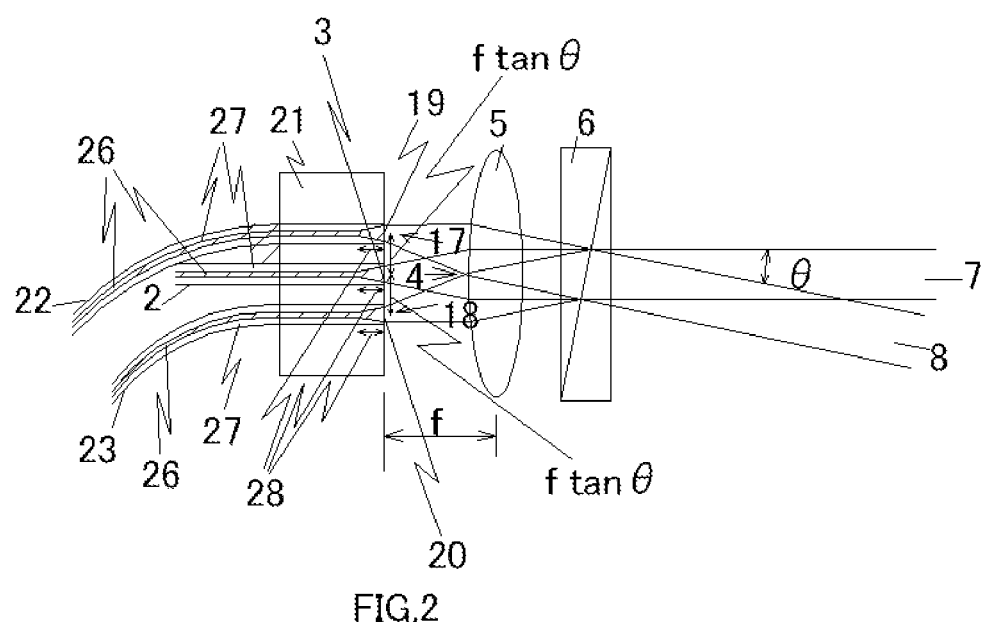
FIG. 2: a detailed explanation of light pass of the incident beam and return light beam near the triple fiber collimator and the first wedge polarizer of the optical isolator of this invention
Figure 3:
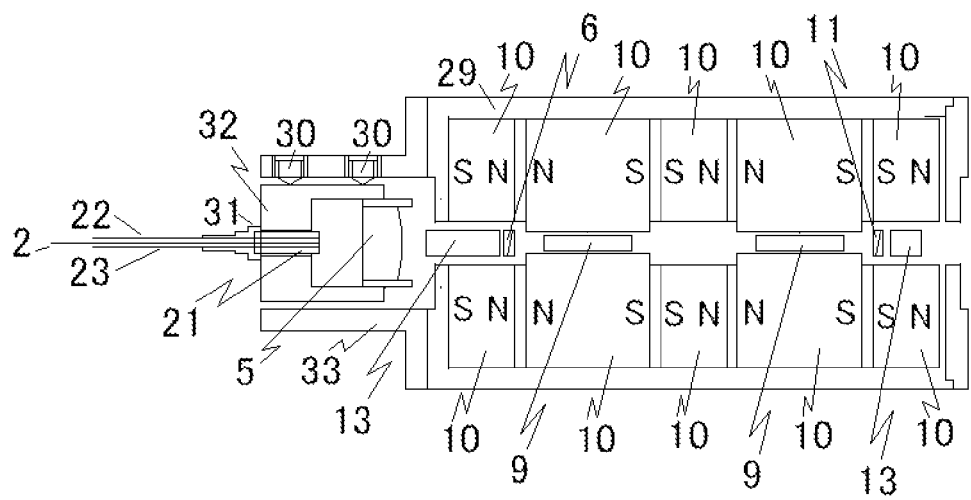
FIG. 3: a cross section of the triple fiber collimator and the optical isolator of this invention

FIG. 3 shows the cross section of an embodiment of this invention. A collimator composed of a three core zirconia ferrule with three fibers and a lens 5 is combined with an optical isolator whose polarizers 6 and 11 are Rochon prisms as a kind of wedge polarizer.

Figures 4A, 4B:
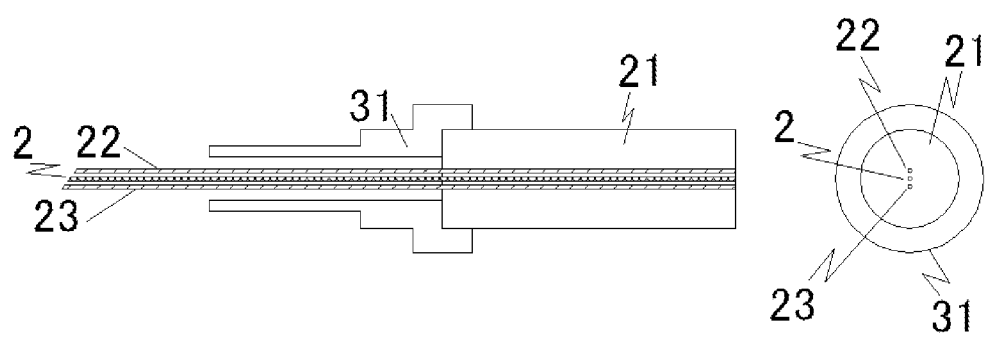
FIG. 4A: a cross section of the three holes zirconia ferrule with three fibers of this invention.
FIG. 4B: a right side view of the three holes zirconia ferrule with three fibers of this invention.

FIGS. 4A and 4B show details of the collimator. Three fibers 2, 22, and 23 are fixed in the three holes of the zirconia ferrule 21 mounted on plug 31. The first fiber 2 has a clad diameter of 125 micrometers. The core diameter of the end of the first fiber is expanded from initial 10 micrometer to 20 micrometers. The numerical aperture NA of this core expanded fiber is 0.05. The core diameter of both the second fiber 22 and the third fiber 23 is 62.5 micrometers and the clad diameter is 125 micrometers. The core diameter of the second and the third fibers is larger than the core diameter of the first fiber so as to receive the return light easily. Zirconia ferrule with 2.5 mm diameter has a hole with 125 micrometers diameter in the center and two holes with 125 micrometers diameter on both sides of the center hole. As is shown in FIG. 4B for the right side view of the ferrule 21, three fibers have their ends aligned straight in the figure. The distances between the first fiber 2 and the second fiber 22 and between the first fiber 2 and the third fiber 23 are equally 250 micrometers, respectively.

As is shown in FIG. 3, the plug 31 is positionally fixed with respect to the lens 5 having the focus length of 8 mm by means of a holder 32. The collimator is composed of the ferrule 21 and the lens 5 with the ends of the fibers exposed to the end of the ferrule 21 being positioned at focal points of the lens, respectively. The three fibers and one lens substantially provide a collimator which emanates one central collimated outgoing beam and receives two collimated return beams inclined by an angle of 1.8 degrees toward both sides of the central collimated outgoing beam. This collimator is attached to the optical isolator.

The optical isolator using wedge type polarizers employed in the present invention is similar to that used in the inventor's JP2775547B (equivalent to U.S. Pat. No. 5,408,354A) and JP2009-168,894A. The present invention uses Rutile Rochon prisms as wedge polarizers 6 and 11.

Magnets 10 are composed of five magnets. Polarities of adjacent magnets are faced with N to N and with S to S. The first polarizer 6 is a rutile Rochon prism and the second polarizer 11 is also a rutile Rochon prism. Faraday material 9 is a TGG crystal. Birefringent crystal plate 12 is a beam combiner which is disposed outside of Rochon prisms. The isolator has a tube shaped chuck 33 for a collimator holder 32. The inner diameter of the tube shaped chuck 33 is a little larger than the outer diameter of the collimator holder 32. Three sets of two screws, six screws in total, are attached at every 120 degrees around the tube shaped chuck. The angle, the position, and the angular displacement position of the collimator can be adjusted by using these 6 screws.

The Rochon prism uses rutile prism of the angle of 6 degrees and 45 minutes. The return light from the optical isolator is composed of two collimated beams. The beam of the return light from the optical isolator angles by 1.8 degrees to the incident beam. The reflected light from the processing workpiece propagates through the optical isolator and enters into the collimator to the centers of the second and third fibers which are just 250 micrometers apart from the first fiber.

The accuracy of a prism angle is very important to receive the return light with the second and the third fibers. As is described above, the prism angle is decided as 6 degrees and 45 minutes for the return light angle 1.8 degrees. If the prism angle, for instance, is 6 degrees and 15 minutes with a 30 minutes displacement, then the return light angle becomes 1.64 degrees. The position of the return light with the angle of 1.64 degrees is 223 micrometer from the center of first fiber. The positional difference is only 21 micrometer, which is sufficiently within the core diameter of 62.5 micrometers of the receiving fiber. The tolerance of angle 30 minutes is an easy value, for ordinary prism manufacturing technology. Thus, it is not difficult to optically couple this three fiber collimator with the optical isolator.

In order to receive the return light in proper alignment, rotating the collimator around its axis is required to adjust the centers of the second and third fibers so as to coincide with the positions of the return light beams. When the second and third fibers are adjusted within the range of 15.6 micrometers which corresponds to half of the radius of 31.25 micrometers of these fibers, the collimator must be rotated by 3.8 degrees which correspond to arctan (16.5/250). This adjustment accuracy of 3.8 degrees is easy for an ordinary fiber adjustment technology. Thus it is shown from the numerical point of view that it is not difficult to fabricate and adjust the set of the triple fiber collimator and the optical isolator of this invention.

In this detailed description of the invention, Rochon prisms are used as polarizers. These polarizers are also replaceable with the set of glass prism and wedge polarizers which was used in the examples of JP2009-168894A. End-capped fibers are also available for preventing the high power damage instead of the core end expanded fibers.

INDUSTRIAL APPLICABILITY

This invention makes it possible to isolate the return light from the laser oscillator. With the use of this invention the return light does not heat the optical isolator. Thus this invention can be used for high power fiber lasers.

EXPLANATION OF LETTERS AND NUMBERS

1. Fiber laser oscillator
2. Delivery fiber
3. End of delivery fiber
4. Light emanated by fiber impinging to lens
5. first lens
6. The first wedge polarizer
7. One light beam between the first wedge polarizer and the second polarizer
8. Another light beam between the first wedge polarizer and the second polarizer
9. Faraday material
10. Magnet
11. second polarizer
12. Birefringent crystal plate
13. Combined beam
14. Condense lens
15. Workpiece
16. Focus point on the processing workpiece
17. One return light
18. Another return light
19. Fiber end of the one return light
20. Fiber end of another return light
21. Ferrule or V-groove fixing fibers
22. One receiving fiber for return light
23. Another receiving fiber for return light
24. Ceramics tube whose one end is closed
25. Stainless tube whose one end is closed
26. Fiber core
27. Fiber clad
28. Enlarged cross section for light passing through part
29. Optical isolator holder
30. Collimator adjustment screw
31. Plug
32. Collimator holder
33. Collimator holder chuck
34. A Faraday rotator consisting of Faraday material 9 and magnet 10
35. A set of elements, the first wedge polarizer 6, Faraday rotator 34, and the second wedge polarizer 11, which is called as a non-reciprocal part

What is claimed is:
1. An optical isolator comprising:
a Faraday rotator and first and second birefringent crystal wedge polarizers aligned bilaterally to the Faraday rotator, the Faraday rotator and the first and second birefringent crystal wedge polarizers being configured as a non-reciprocal part in which an incident collimated beam entered into the non-reciprocal part through the first birefringent crystal wedge polarizer travels as an outgoing collimated beam upon passing through the Faraday rotator and the second birefringent crystal wedge polarizer, and in which a return light beam entered into the non-reciprocal part through the second birefringent crystal wedge polarizer in an opposite direction in parallel to the outgoing collimated beam is separated into two reverse direction collimated beams upon passing through the first birefringent crystal wedge polarizer;

a first one of the two reverse direction collimated beams travelling in substantially the opposite direction at a certain angle to the incident collimated beam; and a second one of the two reverse direction collimated beams travelling in substantially the opposite direction at the certain angle to the incident collimated beam;

wherein an optic axis of the first reverse direction collimated beam and an optic axis of the second reverse direction collimated beam are in a 180 degree rotation symmetric relation; and a lens having a plurality of focal points and first, second and third optical fibers are configured to have such an arrangement that a first tip end of the first optical fiber is disposed at one of the focal points of the lens such that an incident beam emitted from the first tip end of the first optical fiber and transformed into a collimated beam upon passing through the lens is incident to the first birefringent crystal wedge polarizer of the non-reciprocal part, and that first tip ends of the second and third optical fibers are disposed at others of the focal points of the lens on which the reverse direction collimated beams are focused, respectively, upon passing through the lens, so as to receive the reverse direction collimated beams, wherein the first, second and third optical fibers are fixed in position by a fixing device, wherein a periphery of the lens, portions including the first tip ends of the first, second and third optical fibers, and the fixing device are housed and fixed in a holder, and wherein the reverse direction collimated beams entered into the second and third fibers, respectively, are led therethrough to outside of the holder.

2. The optical isolator according to claim 1, further comprising:

a device for scattering or absorbing the light beams emitted from second tip ends of the second and third optical fibers, the device being provided near the second tip ends of the second and third optical fibers which are positioned outside the holder.

3. The optical isolator according to claim 2, wherein a core diameter of the second and third optical fibers is larger than 1.1 times of a core diameter of the first optical fiber.

4. The optical isolator according to claim 2, wherein the device for scattering or absorbing the light beams emitted from the second tip ends of the second and third optical fibers is air-cooled or water-cooled.

5. The optical isolator according to claim 1, wherein a core diameter of the second and third optical fibers is larger than 1.1 times of a core diameter of the first optical fiber.

6. The optical isolator according to claim 1, wherein the optical isolator is a high powered optical isolator, the outgoing collimated beam is a laser beam suitable for use in a laser processing operation, and the return light beam is a reflection of at least a portion of the outgoing collimated beam.

* * * * *